(12) United States Patent
Byun et al.

(10) Patent No.: US 10,743,268 B2
(45) Date of Patent: Aug. 11, 2020

(54) METHOD AND APPARATUS FOR MEASURING DOWNLINK SYNCHRONIZATION IN WIRELESS COMMUNICATION SYSTEM

(71) Applicant: LG ELECTRONICS INC., Seoul (KR)

(72) Inventors: Ilmu Byun, Seoul (KR); Jiwon Kang, Seoul (KR); Heejeong Cho, Seoul (KR); Genebeck Hahn, Seoul (KR); Heejin Kim, Seoul (KR); Hyunjin Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/099,630

(22) PCT Filed: May 24, 2017

(86) PCT No.: PCT/KR2017/005376
§ 371 (c)(1),
(2) Date: Nov. 7, 2018

(87) PCT Pub. No.: WO2017/209433
PCT Pub. Date: Dec. 7, 2017

(65) Prior Publication Data
US 2019/0150108 A1 May 16, 2019

Related U.S. Application Data

(60) Provisional application No. 62/344,982, filed on Jun. 2, 2016.

(51) Int. Cl.
*H04W 56/00* (2009.01)
*H04W 76/30* (2018.01)
(Continued)

(52) U.S. Cl.
CPC ....... *H04W 56/001* (2013.01); *H04J 11/0069* (2013.01); *H04W 24/10* (2013.01);
(Continued)

(58) Field of Classification Search
None
See application file for complete search history.

(56) References Cited

U.S. PATENT DOCUMENTS

2004/0174845 A1* 9/2004 Koo ............... H04W 36/0055
370/328
2010/0260156 A1* 10/2010 Lee ............... H04W 56/0035
370/336
(Continued)

FOREIGN PATENT DOCUMENTS

| KR | 100689566 | 3/2007 |
|---|---|---|
| KR | 1020100113435 | 10/2010 |
| KR | 1020150087842 | 7/2015 |

OTHER PUBLICATIONS

PCT International Application No. PCT/KR2017/005376, International Search Report dated Aug. 28, 2017, 4 pages.

*Primary Examiner* — Diane L Lo
(74) *Attorney, Agent, or Firm* — Lee, Hong, Degerman, Kang & Waimey

(57) ABSTRACT

Provided are a method and an apparatus for obtaining downlink synchronization in a wireless communication system. The wireless communication system that is proposed has an environment in which the resource location of a downlink synchronization signal changes due to the application of multiple numerology. Particularly, a terminal receives synchronization signal information from a base station. The synchronization signal information includes candidate resources from which synchronization signals with respect to a tracking area can be transmitted, and the order of detecting the synchronization signals from the
(Continued)

candidate resource win respect to the tracking area. The terminal detects the synchronization signal on the basis of the synchronization signal information.

11 Claims, 13 Drawing Sheets

(51) Int. Cl.
*H04J 11/00* (2006.01)
*H04W 24/10* (2009.01)
*H04W 68/02* (2009.01)
*H04W 72/14* (2009.01)
*H04W 74/08* (2009.01)

(52) U.S. Cl.
CPC ....... *H04W 56/0015* (2013.01); *H04W 68/02* (2013.01); *H04W 72/14* (2013.01); *H04W 74/0833* (2013.01); *H04W 76/30* (2018.02); *H04J 11/0073* (2013.01); *H04J 11/0076* (2013.01); *H04J 2211/005* (2013.01)

(56) References Cited

U.S. PATENT DOCUMENTS

| | | | |
|---|---|---|---|
| 2014/0050206 A1 | 2/2014 | Seo et al. | |
| 2014/0185554 A1* | 7/2014 | Kato | H04L 5/0016 370/329 |
| 2015/0289219 A1* | 10/2015 | Kim | H04W 56/0015 370/350 |

* cited by examiner

METHOD AND APPARATUS FOR MEASURING DOWNLINK SYNCHRONIZATION IN WIRELESS COMMUNICATION SYSTEM

CROSS-REFERENCE TO RELATED APPLICATIONS

This application is the National Stage filing under 35 U.S.C. 371 of International Application No. PCT/KR2017/005376, filed on May 24, 2017, which claims the benefit of U.S. Provisional Application No. 62/344,982, filed on Jun. 2, 2016, the contents of which are all hereby incorporated by reference herein in their entirety.

BACKGROUND OF THE INVENTION

Field of the Invention

The present invention relates to wireless communication and, most particularly, to a method and apparatus for measuring downlink synchronization in a wireless communication system.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a $3^{rd}$ generation partnership project (3GPP) long term evolution (LTE) system, a user equipment (UE) in an idle state must perform an RRC connection setup and a data connection setup before data transmission is performed. This means that both of a logical connection (RRC connection) between a base station (BS) and the UE and a logical connection (S1 connection/interface, EPS connection) between a mobility management entity (MME) and the UE are set up. Therefore, in order for the UE to perform data transmission, it takes an additional time corresponding to a time required to perform the connection setup. However, when the UE transmits or receives large-sized data once or twice, it is ineffective to perform the connection setup. Accordingly, a connectionless transmission method may be considered to solve this problem.

SUMMARY OF THE INVENTION

Technical Objects

This specification provides a method and apparatus for measuring downlink synchronization in a wireless communication system.

Technical Solutions

This specification proposes a method and apparatus for measuring downlink synchronization based on a connectionless transmission procedure in a wireless communication system.

The apparatus includes a radio frequency (RF) unit transmitting and receiving radio signals, and a processor being operatively connected to the RF unit.

Firstly, the terms will be defined. A connectionless transmission may correspond to the transmission of data performed by a UE, which is in an idle state, to the base station. A connection transmission (or connected transmission) may correspond to the transmission of data performed by a UE to the base station, after an RRC connection and a data connection is established between the UE and the base station. A numerology may correspond to diverse numeric values that can be used in a next generation communication system, which is used for the purpose of high reliability and low latency (or delay). For example, a numerology may correspond to a length of a subframe (TTI length), subcarrier spacing, a number of symbols in a subframe, and/or a CP length, and so on.

First, the UE receives first synchronization signal information from the base station. The first synchronization signal information includes candidate resources where the synchronization signal can be transmitted for a tracking area (TA), and an order by which the synchronization signals are being detected from the candidate resources for the TA.

The UE detects a synchronization signal based on the first synchronization signal information.

In a wireless communication system applying multiple numerologies, since the position of a resource transmitting a synchronization signal for each numerology may be changed, it will be difficult to measure the downlink synchronization. If the downlink synchronization cannot be acquired, procedures, such as cell search, should all be performed, thereby causing a delay (or latency) in the communication. Therefore, the base station may be capable of easily acquiring the downlink synchronization by signaling additional information, such as the synchronization signal information.

At this point, the UE may receive the synchronization signal from the base station, and the resource in which the synchronization signal is received may be changed in accordance with the numerology within the candidate resources. The TA managing unit manages the resource from which the synchronization signal is being transmitted in TA units. Additionally, the first synchronization signal information may designate an order for detecting the synchronization signals in accordance with an order having the largest number of synchronization signal transmissions in TA units or in accordance with an order of having the highest likelihood detecting a synchronization signal. Accordingly, even if a resource receiving a synchronization signal changes in accordance with the numerology, the UE may determine the changed resource position of the synchronization signal and may then acquire the downlink synchronization.

In case the UE belongs to the TA, or in case the UE deviates from the TA and belongs to another TA, the first synchronization signal information may be received via L2/L3 signaling.

Additionally, the first synchronization signal information may be received while the UE is in a state of disconnecting itself from the base station, or the first synchronization signal information may be received along with a paging message while the UE is in a state of being disconnected from the base station. The state of the UE disconnecting itself from the base station may correspond to a state in which the UE has not yet released (or cancelled) its connection with the base station but currently attempting to disconnect itself from the base station.

When operating in the state of disconnecting itself from the base station, the UE may receive a synchronization signal transmitting resource list of a neighbor cell including second synchronization signal information from the base station. Additionally, the UE may update the second synchronization signal information. This is because, if the UE is aware of the synchronization signal transmitting resource of a neighboring cell before it shifts from the connected state (or connection state) to the disconnected state (or connectionless state), it will be more preferable to detect the synchronization signal by using this information.

The updated second synchronization signal information may be used for a predetermined period of time. The updated second synchronization signal information may be deleted or updated once again after the predetermined period of time. The predetermined period of time may be determined in accordance with a movement rate of the UE and a coverage of the neighbor cell. More specifically, unless the synchronization signal transmitting resource list of the neighbor cell becomes invalid due to the movement of the UE to a long distance, the UE may detect the synchronization signal by using the information of the neighbor cell.

At this point, the first synchronization signal information may not be used during the predetermined period of time and may be used after the predetermined period of time. More specifically, after the predetermined period of time, the UE may once again be capable of detecting synchronization signals through the first synchronization signal information.

The synchronization signal may correspond to a Primary Synchronization Signal (PSS) or a Secondary Synchronization Signal (SSS).

Additionally, the UE may receive an indicator indicating whether or not a resource, through which the synchronization signal is received, is changed within the candidate resources. In case the indicator indicates that the resource, through which the synchronization signal is received, is changed within the candidate resources, the indicator may be received from the base station at the same time as the first synchronization signal information. In case the indicator indicates that the resource, through which the synchronization signal is received, is not changed within the candidate resources, just as in the legacy communication system, a single numerology may be applied to the communication system, wherein the position of the transmission resource of the synchronization signal does not change. Accordingly, since additional signaling such as the first synchronization signal information is not needed, the UE does not receive the first synchronization signal information from the base station.

Effects of the Invention

By using the proposed technique (or method), when a UE being in a connectionless state detects a synchronization signal in a next generation communication system, which authorizes multiple numerologies within a single carrier, the overhead may be reduced and the detection speed for detecting a synchronization signal may be increased at the same time.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present invention are not limited thereto.

Figure 1:
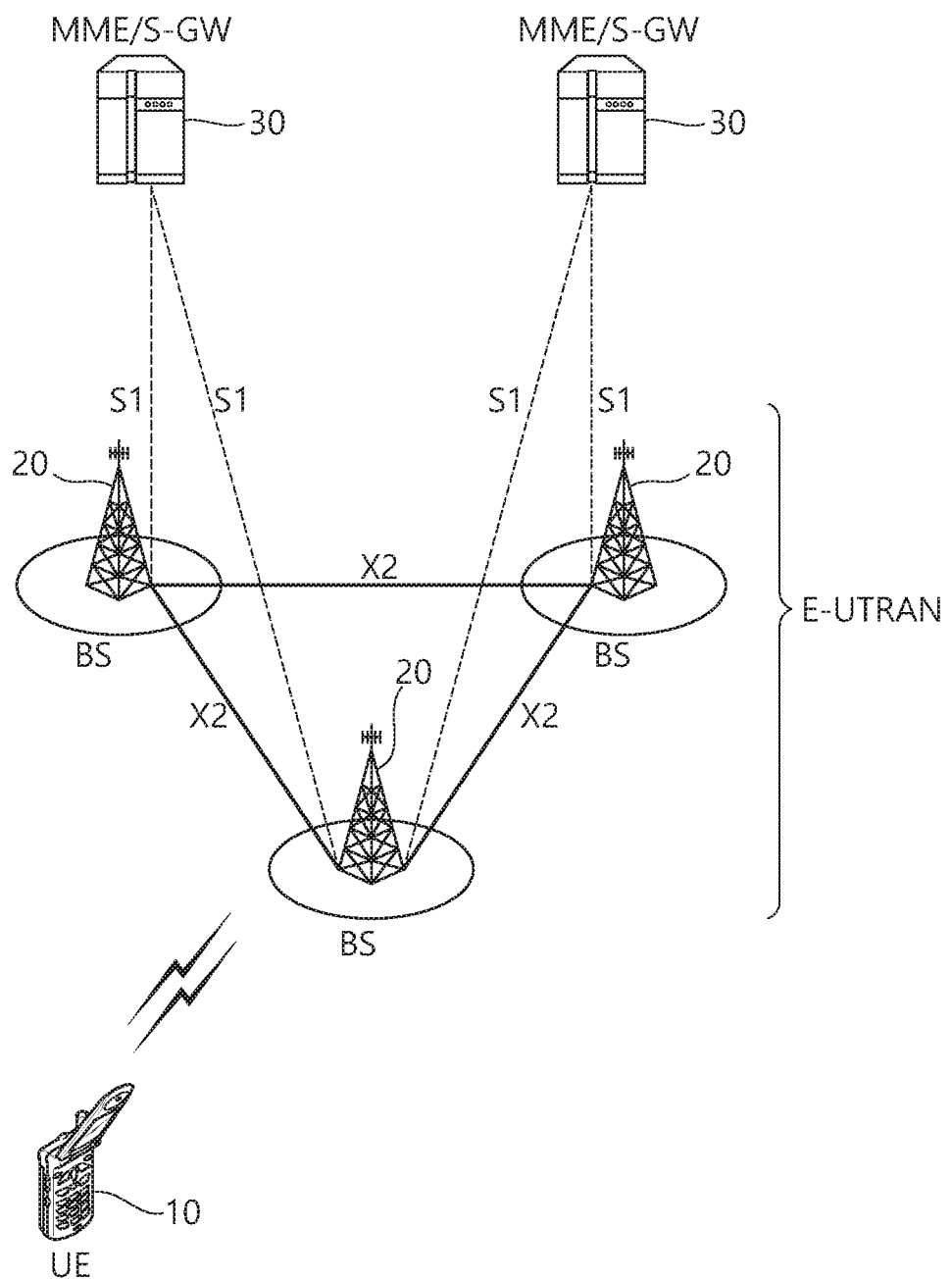
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) (20) which provides a control plane and a user plane to a user equipment (UE) (10). The UE (10) may be fixed or mobile, and may be referred to as another terminology, such as a mobile station (MS), a user terminal (UT), a subscriber station (SS), a mobile terminal (MT), a wireless device, etc. The BS (20) is generally a fixed station that communicates with the UE (10) and may be referred to as another terminology, such as an evolved node-B (eNB), a base transceiver system (BTS), an access point, and so on.

The BSs (20) are interconnected by means of an X2 interface. The BSs (20) are also connected by means of an S1 interface to an evolved packet core (EPC) (30), more specifically, to a mobility management entity (MME) through S1-MME and to a serving gateway (S-GW) through S1-U.

The EPC (30) includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
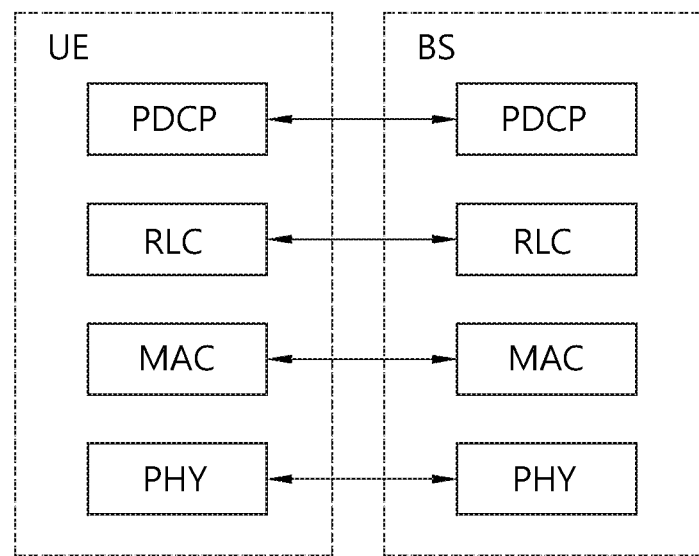
FIG. 2 is a diagram illustrating a radio protocol architecture for a user plane.
Figure 3:
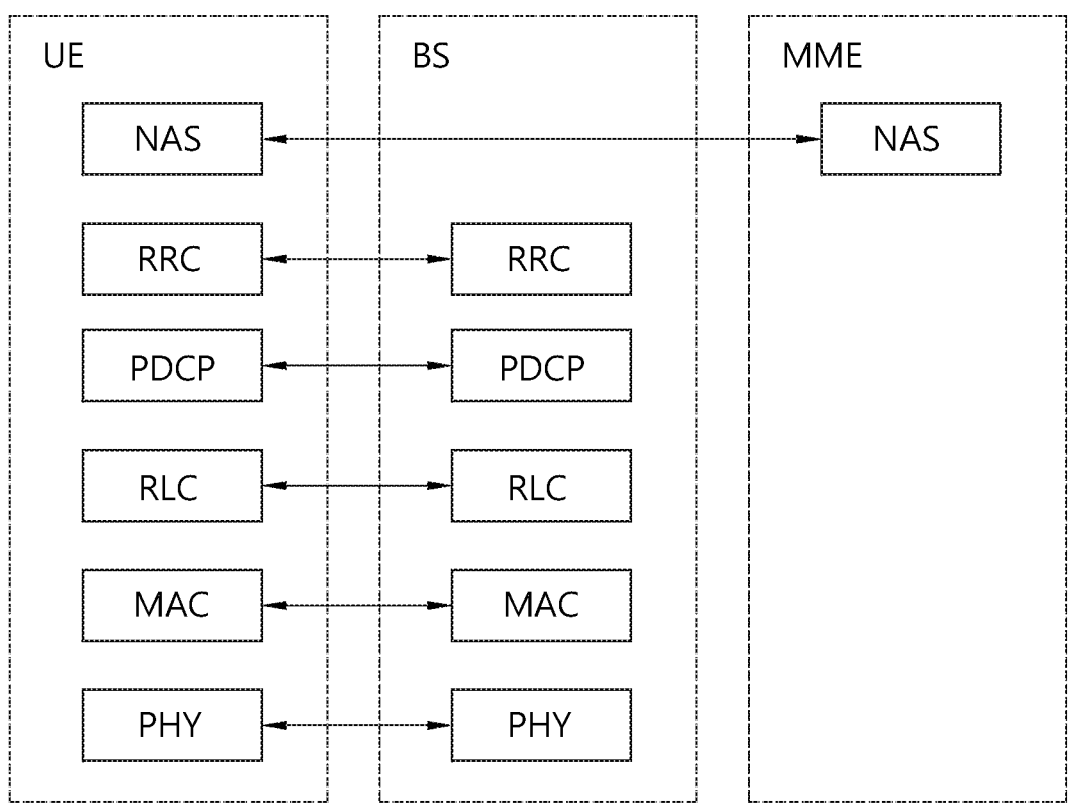
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
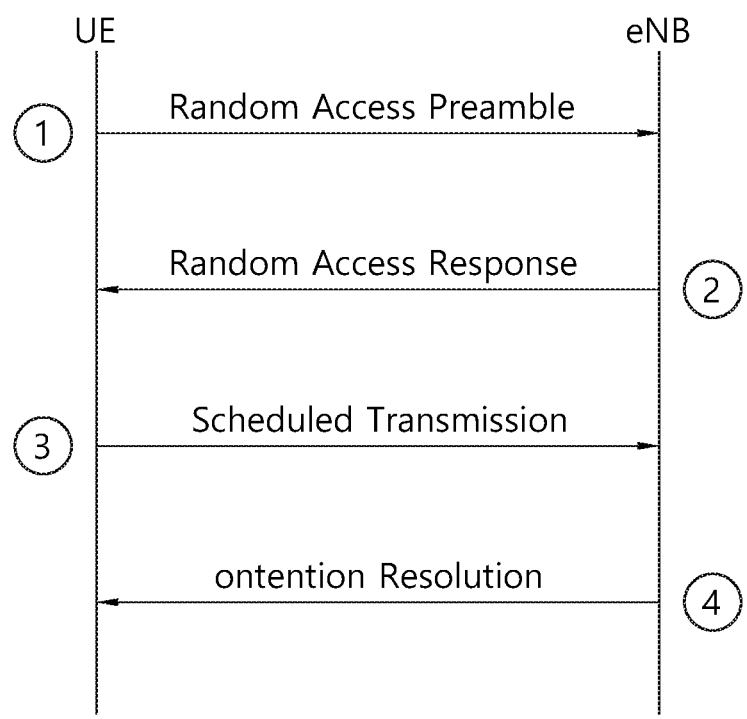
FIG. 4 shows a process of an operation performed between a user equipment (UE) and an eNodeB (eNB) in a contention-based random access procedure.

FIG. 4 shows a process of an operation performed between a UE and an eNB in a contention-based random access procedure.

First, in the contention-based random access, the UE may randomly select a random access preamble in a group of random access preambles indicated through system information or a handover command, may select a PRACH resource capable of transmitting the random access preamble, and may subsequently transmit the selected random access preamble to the eNB (step 1).

After transmitting the random access preamble, the UE may attempt to receive a response for the random access preamble in a random access response reception window indicated through the handover command (step 2). More particularly, the random access information may be transmitted in a form of a MAC PDU, and the MAC PDU may be transmitted on a physical downlink shared channel (PDSCH). Further, a physical downlink control channel (PDCCH) is transmitted so that the UE can properly receive information transmitted on the PDSCH. That is, the PDCCH includes information regarding a UE for receiving the PDSCH, frequency and time information of radio resources of the PDSCH, a transmission format of the PDSCH, or the like. Herein, if the PDCCH is successfully received, the UE may properly receive a random access response transmitted on the PDSCH according to information of the PDCCH. The random access response may include a random access preamble identifier (ID), an uplink (UL) grant, a temporary C-RNTI, a time alignment command (TAC), or the like. Herein, the random access preamble ID is included in the random access response. This is to inform the UE about which information is information regarding a UL grant, a temporary C-RNTI, a time alignment command among valid (available) information. As such, the random access preamble ID is necessary since one random access response may include random access information for one or more UEs. Herein, the random access preamble ID may be the same as a random access preamble selected by the UE in the step 1.

When the UE receives a random access response which is valid for the UE, the UE may process information included in the random access response. That is, the UE stores the temporary C-RNTI. In addition, the UE uses a UL grant to transmit data stored in a buffer of the UE to the eNB or to transmit newly generated data to the eNB (step 3). Herein, a UE identifier must be necessarily included in data included in the UL grant (message 3). The reason above is that, in the contention-based random access procedure, the eNB cannot determine which UEs perform the random access procedure, and the UEs must be identified for contention resolution at a later time. Herein, in order to include the UE identifier, two different methods may be provided. A first method is for transmitting a cell identifier of the UE through a UL grant as to whether the UE has already received a valid cell identifier assigned in a corresponding cell before the random access procedure. On the contrary, a second method is for transmitting a unique ID of the UE if the UE does not receive the valid cell ID before the random access procedure. In general, the unique identifier of the UE is longer than the cell identifier. If the UE has already transmitted data through the UL grant in step 3, the UE starts a contention resolution timer.

After data is transmitted together with an identifier through the UL grant included in the random access response, the UE waits for an indication or instruction of an eNB for the contention resolution. That is, the UE attempts a reception of a PDCCH to receive a specific message (step 4). Herein, two methods are present to receive the PDCCH. As described above, if the UE identifier transmitted through the UL grant is a cell identifier, the UE attempts a reception of the PDCCH by using a cell identifier of the UE. If the UE identifier transmitted through the UL grant is a unique identifier of the UE, the UE attempts a reception of the PDCCH by using a temporary C-RNTI included in the random access response. Thereafter, in the former case, if the PDCCH (message 4) is received through the cell identifier before the contention resolution timer expires, the UE determines that the random access procedure is successfully performed, and finishes the random access procedure. In the latter case, if the PDCCH is received through the temporary cell identifier before the contention resolution timer expires, the UE checks data (message 4) transmitted by a PDSCH indicated by the PDCCH. If the unique identifier of the UE is included in the data, the UE determines that the random access procedure is successfully performed, and finishes the random access procedure.

Hereinafter, connectionless transmission will be described.

In a 3GPP LTE system, a UE in an idle state must perform an RRC connection setup and a data connection setup before data transmission is performed. This means that both of a logical connection (RRC connection) between an eNB and the UE and a logical connection (S1 connection/interface, EPS connection) between a mobility management entity (MME) and the UE are set up.

Figure 5:
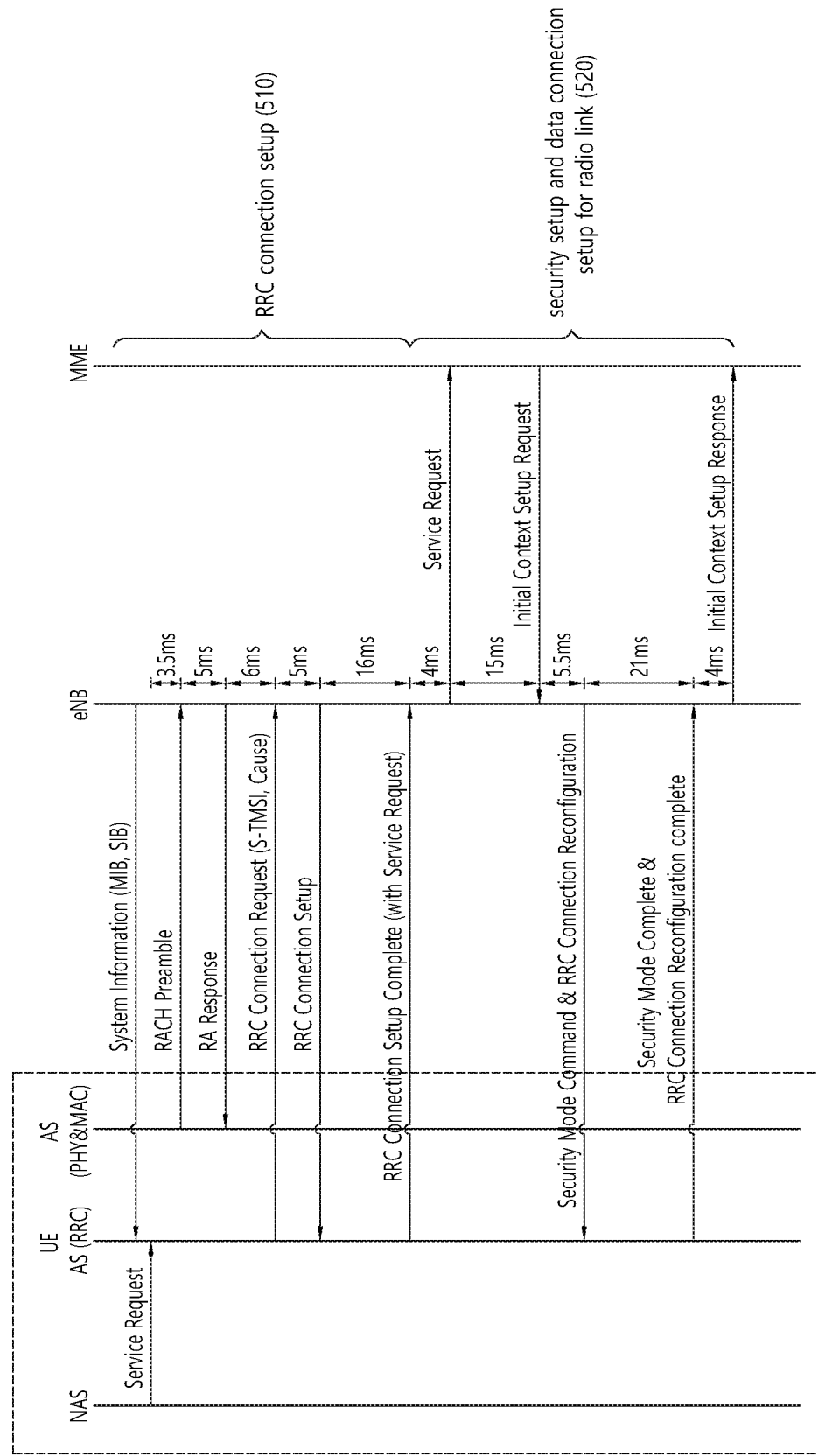
FIG. 5 shows a connection setup procedure and a required time in $3^{rd}$ generation partnership project (3GPP) long term evolution (LTE).

FIG. 5 shows a connection setup procedure and a required time in 3GPP LTE.

Referring to FIG. 5, a UE first performs an RRC connection setup (see 510) with an eNB before transmitting data. The UE receives system information such as a master information block (MIB) and a system information block (SIB) from the eNB. In addition, the UE transmits a random access preamble through an RACH resource, and receives a random access response in response thereto. Thereafter, the UE transmits an RRC connection request to the eNB, and receives an RRC connection setup message from the eNB. When the UE transmits an RRC connection setup complete message to the eNB, the RRC connection setup (see 510) may be performed.

When the RRC connection setup (see 510) is performed with respect to the eNB, the UE performs a security setup and data connection setup for a radio link (see 520) with respect to a mobility management entity (MME). The eNB transmits a service request to the MME, and the MME transmits an initial context setup request to the eNB. The eNB transmits security mode command and RRC connection reconfiguration messages to the UE. The UE transmits security mode complete and RRC connection reconfiguration complete messages to the eNB. Thereafter, the eNB transmits an initial context setup request to the MME. In doing so, the UE may perform the security setup and data connection setup for the radio link (see 520) with respect to the MME.

Since it takes 35.5 ms in total for the RRC connection setup (see 510) and it takes 49.5 ms in total for the security setup and data connection setup for the radio link (see 520), it takes 85 ms in total as a time for transitioning a connected state of the UE in the idle state.

If it is intended to transmit UL data after transitioning the connected state of the UE, the UE must undergo a step of transmitting a scheduling request to the eNB. A procedure of transmitting the UL data and a delay caused thereby are described below with reference to FIG. 6 and FIG. 7.

Figure 6:
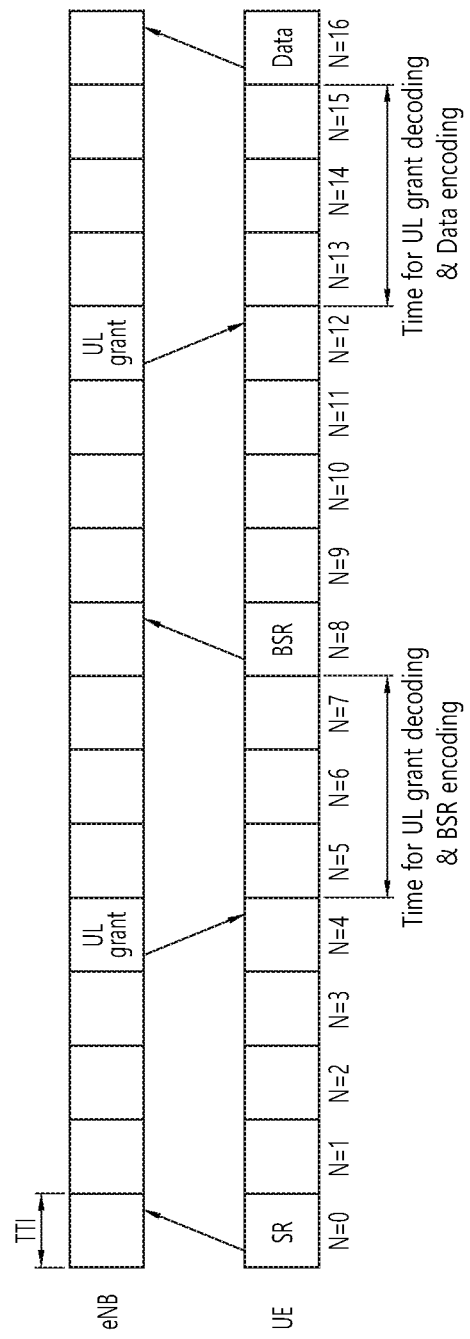
FIG. 6 shows a required time in a method of assigning an uplink resource through a scheduling request in 3GPP LTE.

FIG. 6 shows a required time in a method of assigning a UL resource through a scheduling request in 3GPP LTE.

Referring to FIG. 6, a UE transmits a scheduling request (SR) to an eNB, and the eNB transmits a UL grant to the UE. The UE decodes the UL grant during a specific duration, and encodes a buffer status report (BSR). Thereafter, the UE transmits the encoded BSR to the eNB, the eNB transmits the UL grant to the UE, and the UE transmits data to the eNB according to the UL grant. The method of assigning the UL resource through the SR may generate a delay of 9.5 ms in total.

Figure 7:
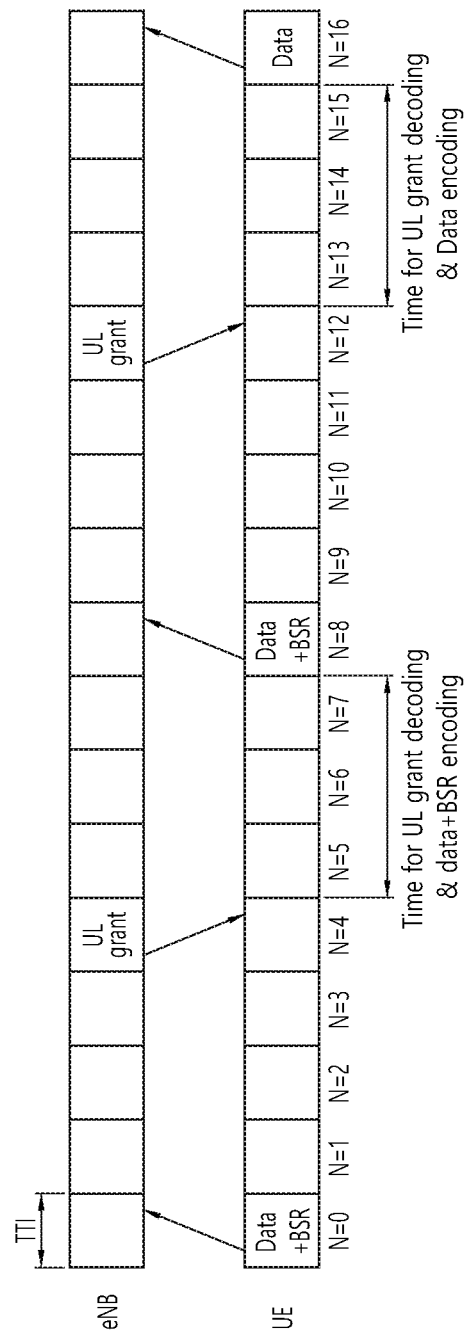
FIG. 7 shows a required time in a method of assigning an uplink resource through a scheduling request (SR) and a buffer status report (BSR) in 3GPP LTE.

FIG. 7 shows a required time in a method of assigning a UL resource through a scheduling request (SR) and a buffer status report (BSR) in 3GPP LTE.

Referring to FIG. 7, a UE transmits data and a BSR to an eNB, and the BS transmits a UL grant to the UE. The UE decodes the UL grant during a specific duration, and encodes the data and the BSR. Thereafter, the UE transmits the encoded data and BSR to the eNB, the eNB transmits the UL grant to the UE, and the UE transmits data to the eNB according to the UL grant. The method of assigning the UL resource through the SR and the BSR of the UE may generate a delay of 17.5 ms in total.

That is, it may take 9.5 ms to 17.5 ms in total as a time of occupying a radio resource and transmitting data by a UE which has transitioned to a connected state. Since it takes 85 ms in total as a time required for the UE in the idle state to transition to the connected state, it may take 94 ms to 102.5 ms in total as a time required for the UE in the idle state to transmit data. Accordingly, a connectionless transmission method may be considered to decrease a delay time depending on the transitioning of the connected state of the UE.

In general, when there is no data to be transmitted, the UE transitions to a discontinuous reception mode or an idle state to achieve power saving or to decrease a network overhead. In the discontinuous reception mode in which a connection set up with the eNB is maintained, a handover is performed when the UE moves between the eNBs. However, in a situation where too many UEs are connected to a single eNB and all UEs are moving UEs, there is a disadvantage in that a signaling overhead is increased in a radio duration for performing the handover. Further, there is a disadvantage in that the UE has to perform the handover frequently when a communication eNB having a small coverage such as a road side unit is installed. Therefore, the connectionless transmission method may be used to decrease the signaling overhead in the radio duration caused by the handover.

In general, a UE having no data being scheduled to be transmitted is shifted to a discontinuous reception mode or idle state (or mode) for power saving or for reducing network overhead. In the discontinuous reception mode, during which the base station maintains the connection configuration (or connection settings), when the UE relocates from one base station to another, the UE performs handover. However, in a situation where a large number of UEs is connected to a single base station and where all of the UEs correspond to mobile terminals (or mobile devices), it is disadvantageous in that the signaling overhead of a wireless section for performing the handover increases. Additionally, in a case where a communication base station having a small coverage, such as a Road Side Unit, is installed, there also lies a disadvantage in that the UE is required to frequently perform the handover. Therefore, in order to reduce the signaling overhead during the wireless section that is caused by the handover, a connectionless transmission method may be used.

Figure 8:
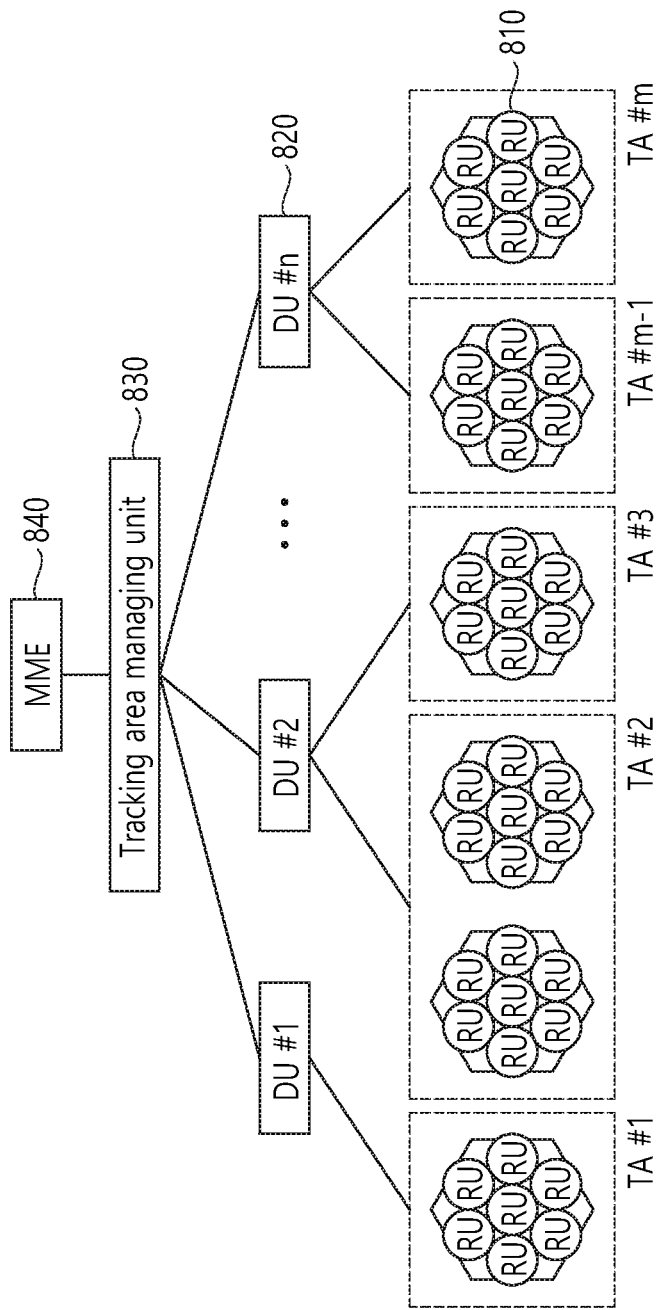
FIG. 8 shows a network environment showing a tracking area.

FIG. 8 shows a network environment showing a tracking area (TA).

Referring to FIG. 8, the base station may be implemented by being divided into an apparatus for processing radio signals (or Remote Radio Head (RRH) or Radio Unit (RU)) and an apparatus for processing digital signals (or Digital Unit (DU)).

A network environment includes a plurality of radio units (RUs) (810), a plurality of digital units (DUs) (DU #1-DU # n) (820), a tracking area managing unit (830), and an MME (840). The tracking area managing unit (830) may be connected to a Femto gateway (not shown). The tracking area managing unit (830) may also be separately implemented, as shown in FIG. 8, or may be implemented in the DU (820).

The RU (810) converts a digital signal that is received from the DU (820) to a radio frequency (RF) signal in accordance with the frequency band and amplifies the converted signal. The RU (810) is installed in a service area. A group of Rus for tracking areas (TA #1-TA # m).

The DU (820) encodes or decodes a radio digital signal and is connected to a core network. One DU (820) may manage a plurality of RUs (810). The DU (820) may be connected to at least one tracking area.

The MME (840) manages a tracking area identifier (TAI) list. The MME (840) transmits a tracking area identifier list of the UE to the UE. The MME (840) sends a request to transmit a paging message to base stations corresponding to tracking areas in which the UE is positioned. In case the UE has a data packet that is to be transmitted, the MME (840) sends a request to transmit a paging message to base stations corresponding to tracking area in which the UE is positioned.

The tracking area managing unit (830) is connected to at least one DU. The tracking area managing unit (830) is dynamically mapped to a plurality of RUs being connected to the DUs (DU #1-DU # n) and dynamically generates tracking areas.

The tracking area managing unit (830) receives the tracking area identifier list of the UE from the MME (840). Then, the tracking area managing unit (830) reconfigures the tracking area identifier list of the UE based on movement information of the UE and network configuration information. The movement information of the UE corresponds to information estimating the movement path of the UE, which is calculated based on movement patterns or history of the UE. The network configuration information may include resource information of the RU/DU, geographical information of the RU, and so on.

In a communication system where the RU and the DU are dynamically connected to one another based on the virtualization technology, the MME (840) only configures the list of tracking area identifiers based on RU/DU information, which is configured during the initial installation, and is incapable of knowing the RU/DU that varies dynamically. However, since the tracking area managing unit (830) knows the information related to the RU/DU, the tracking area managing unit (830) may dynamically map the RUs and may reconfigure the list of tracking area identifiers. By doing so, the tracking area managing unit (830) may reduce the amount of paging messages being unnecessarily transmitted by the RU.

Figure 9:
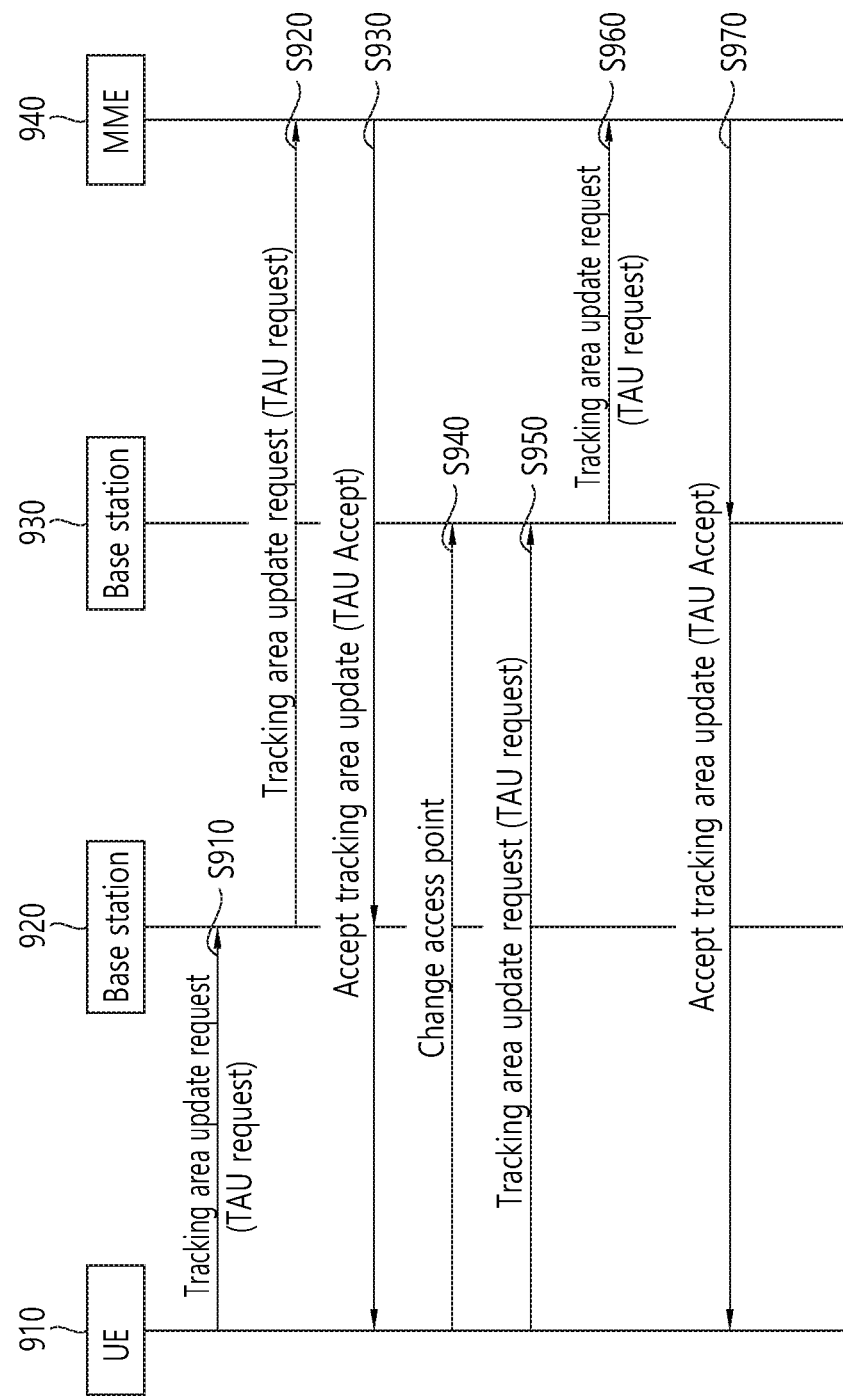
FIG. 9 is a flow chart showing an example of a tracking area update procedure.

FIG. 9 is a flow chart showing an example of a tracking area update procedure.

In case a UE (910) existing in TA #1 moves (or shifts) to TA #2, an MME (940) acquires information on the tracking area of the corresponding UE after its movement (or relocation) by performing a tracking area update (TAU) procedure. Herein, a base station (920) belonging to TA #1 and a base station (930) belonging to TA #2 are differentiated from one another.

Referring to FIG. 9, the UE (910) transmits a tracking area update (TAU) request message to the base station (920) (S910). The tracking area update (TAU) request message includes a tracking area code (TAC), e.g., TAC10, to which the base station (920) belongs.

The base station (920) delivers the tracking area update (TAU) request message to the MME (940) (S920).

The MME (940) transmits a TAU Accept message accepting (or authorizing) the tracking area update to the UE (910) (S930). The MME (940) generates a list of tracking area identifiers (TAIs) based on the TACs including TAC10, which is received from the UE (910), e.g., TAC09, TAC10, TAC11. The MME (940) transmits the TAU Accept message, which includes the tracking area identifier list, to the UE (910). The tracking area identifier list corresponds to tracking areas that are related to the UE (910).

The UE (910) is relocated (or moved) and changes its access point to the base station (930) (S940). The UE (910) does not perform any tracking area update in areas that are included in the tracking area identifier list. However, in case the base station (930) corresponds to a base station being configured with a tracking area code that is not included in the tracking area identifier list, e.g., TAC20, the UE (910) performs the tracking area update as described below.

The UE (910) transmits a tracking area update request message to the base station (930) (S950), and the base station (930) delivers the tracking area update request message to the MME (940) (S960).

The MME (940) transmits a TAU Accept message including the updated tracking area identifier list to the UE (910) (S970). The updated tracking area identifier list may include, for example, TAC19, TAC20, TAC21.

In the next generation communication system, Internet of Things (IoT) services for diverse industries are expected to be adopted. Since the IoT service has diverse requirements each being different from one another, in order to satisfy such requirements, diverse numerologies are needed. Therefore, in the next generation communication system, diverse numerologies are expected to be adopted. Herein, a numerology corresponds to diverse numeric values that may be used in the next generation communication system, which is used for the purpose of high reliability and low latency (or delay). For example, a numerology may correspond to a length of a subframe (TTI length), subcarrier spacing, a number of symbols in a subframe, and/or a CP length, and so on.

A method for adopting diverse numerologies may be divided into two different types. Firstly, a method of applying only one numerology in a single carrier. And, secondly, a method of applying diverse numerologies even in a single carrier. The first method is advantageous for its simple implementation. However, since an available bandwidth is determined for each numerology, this method has poor resource utilization. The second method may have a more complicated implementation as compared to the first method. However, since the available bandwidth for each numerology may be adjusted freely, the second method has excellent resource utilization. In the next generation communication system, since diversification of services is expected, and since the service type being required for each cell may vary from one another, the second method (the method of applying multiple numerologies in a single carrier) should be applied. For example, discussion is being made on the application of multiple numerologies in a single carrier in the current 3GGP.

Since a number of UEs belonging to each cell and the types of services being required by the UEs differ from one another for each cell, the bandwidths being allocated to each numerology may also differ from one another. Accordingly, the positions of resources transmitting a synchronization signal (e.g., PSS or SSS) for each cell may also vary.

In case of a UE operating in a connectionless state (or mode), the base station is incapable of determining the position of the corresponding UE. Therefore, there lies a problem in that the base station is incapable of indicating the UE of the signal transmission resource per numerology of each cell. The UE that is unaware (or uninformed) of the transmission position of the synchronization signal may need to estimate the synchronization signal corresponding to all candidate resource group. And, by doing so, this may cause a considerable amount of overhead to the UE.

In this specification, the connectionless mode UE (or UE operating in the connectionless state) includes both an active mode UE having its connection released (or cancelled) and a sleep mode UE. In this specification, although a unit managing the movement of the connectionless mode UE is referred to as a Tracking Area (TA), the corresponding tracking area (TA) may have a different characteristic from the tracking area of the legacy LTE system. For example, the UE may have a different tracking area (TA) for each state (or mode). More specifically, the UE may separately have a tracking area for the connectionless transmission and a tracking area for the idle state. Additionally, in case the UE seeks to perform communication in diverse numerologies, the UE may have different tracking areas per numerology.

More specifically, this specification proposes a signaling method for efficiently matching downlink synchronization when UES, which are disconnected from the next generation communication system applying multiple numerologies, move (or relocate) to different cells.

Figure 10:
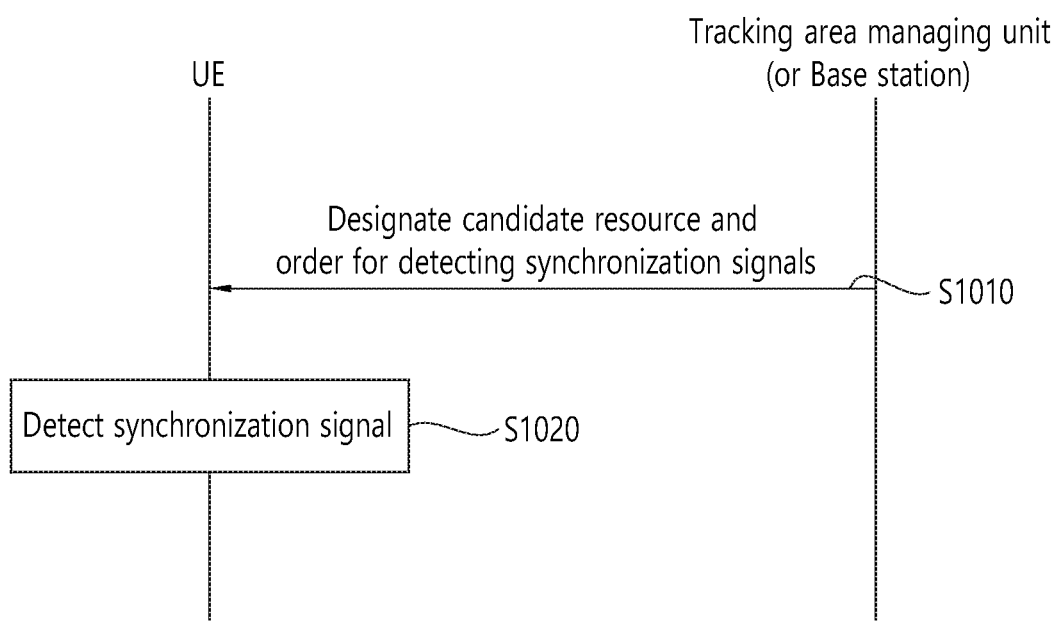
FIG. 10 is a diagram showing a procedure of measuring downlink synchronization performed by a wireless communication system applying multiple numerologies according to an exemplary embodiment of this specification.

FIG. 10 is a diagram showing a procedure of measuring downlink synchronization performed by a wireless communication system applying multiple numerologies according to an exemplary embodiment of this specification.

Referring to FIG. 10, the tracking area managing unit transmits candidate resources capable of transmitting synchronization signals and an order of resources capable of detecting synchronization signals within the candidate resources to a UE within the tracking area through the base station via L2/L3 signaling (S1010). Signaling may be delivered by using a unicast or broadcast method within the cell.

The network manages a candidate resource group capable of transmitting synchronization signals in tracking area (TA) units. Additionally, the tracking area managing unit (e.g., MME or primary BS, and so on) may have synchronization signal transmission information of base stations existing in the tracking area, and, then, the tracking area managing unit designates an order for detecting the synchronization signals by an order of the highest likelihood to the UE based on the synchronization signal transmission information (S1010). The UE may reduce the time consumed for performing synchronization signal detection by detecting the synchronization signals using the received information (S1020).

For example, in case the UE deviates from the tracking area, the tracking area managing unit may transmit the order for detecting the synchronization signals to the UE through the base station via L2/L3 signaling. In case the UE deviates from the tracking area, information, such as the order for detecting synchronization signals, may be transmitted along with the synchronization signal information of the base stations within the tracking area.

In case the UE relocates (or moves) to another tracking area while operating in the idle state, the UE shall attempt to detect synchronization signals for all resources that are capable of performing synchronization signal transmission.

In this case, a considerably long period of time may be consumed until the UE detects a synchronization signal.

Since the network is aware of the resource from which synchronization signal transmission is most frequently performed on average, the network may transmit the order for detecting synchronization signals to the UE in an order corresponding to the highest number of synchronization signal transmissions by using this information. The UE that has received this information may reduce the latency (or delay) time in accordance with the detection of synchronization signals by receiving synchronization signals starting from the resource having the highest likelihood.

As another example, the synchronization signal information within the tracking area may be signaled to the UE by the base station during a process in which the UE being in the connected state releases (or cancels) its connection, or the corresponding information may be delivered when the base station transmits a paging message to a UE, which has already released (or cancelled) its connection.

More specifically, when the base station directs (or instructs) a connection release (or cancellation) to the UE, the base station may include information on the synchronization signals within the tracking area and may then transmit this information along with the instruction (or indication) at the same time. As another example, in case the UE requests connection release (or cancellation), the base station may transmit the synchronization signal information by including this information to the response signal corresponding to the connection release request.

As yet another example, although a UE determines the resource performing synchronization detection by referring to the order for detecting the synchronization signals, the UE may arbitrarily change the order for detecting the synchronization signals. The UE may determine the order for detecting synchronization signals in accordance with an order, which is notified (or informed) by the base station, or the UE may arbitrarily determine the order for detecting synchronization signals while only referring to the given order for detecting synchronization signals. This is because, in some cases, if the UE is aware of the resources transmitting the synchronization signals of a neighbor cell (or neighboring cell) before shifting to the connectionless state, it may be more preferable for the UE to use this information.

More specifically, if a UE being in a connected state with the base station shifts to a connectionless state, the base station transmits a list of resources transmitting the synchronization signals (or synchronization signal transmitting resource list) to the UE. The UE that has received this list updates the synchronization signal transmitting resource list of a neighbor cell. The information on the synchronization signal transmitting resource list of the neighbor cell may be transmitted by being included in a connection release (or cancellation) signaling.

Additionally, the UE may maintain the synchronization signal transmitting resource list of the neighbor cell for a time period T. The time period T varies in accordance with a movement rate (or speed) and cell coverage of the UE. The synchronization signal transmitting resource list, which is updated by the UE, includes information on the neighbor cell corresponding to a moment at which the UE has updated the list. Therefore, after the UE has moved (or relocated) to a long distance, the synchronization signal transmitting resource list, which was updated by the UE, is no longer valid. It is preferable that the UE removes the synchronization signal transmitting resource list or updates once again the synchronization signal transmitting resource list after the time period T, while considering its movement rate.

As yet another example, the network manages resources capable of performing synchronization signal transmission per numerology in tracking area (TA) units. The base stations in the tracking area may change resource positions of the synchronization signals only within the candidate resource group. It may be expected that the list of candidate resources per numerology will change gradually (or slowly). Therefore, each base station transmits a synchronization signal only within the candidate resources and, in case a change is needed, each base station requests for a change in the candidate resources to the tracking area managing unit.

In a case where a random base station intends to transmit a synchronization signal from a resource other than the candidate resources for transmitting the synchronization signal, the corresponding base station transmits such request to the tracking area managing unit and waits for a response for a time period T. The tracking area managing unit that has received the corresponding request transmits a signal for updating resources capable of transmitting synchronization signals to the UEs within the tracking area. When the tracking area managing unit determines that the update process is completed, the tracking area managing unit transmits a response signal to the base station. Once the base station receives the response signal, starting from this point, the base station becomes capable of transmitting synchronization signals from the resource that has been requested to be changed. At this point, since all of the UEs within the tracking area is required to receive the tracking area update information, the UEs configure an update time based on the time period T (response waiting time).

Figure 11:
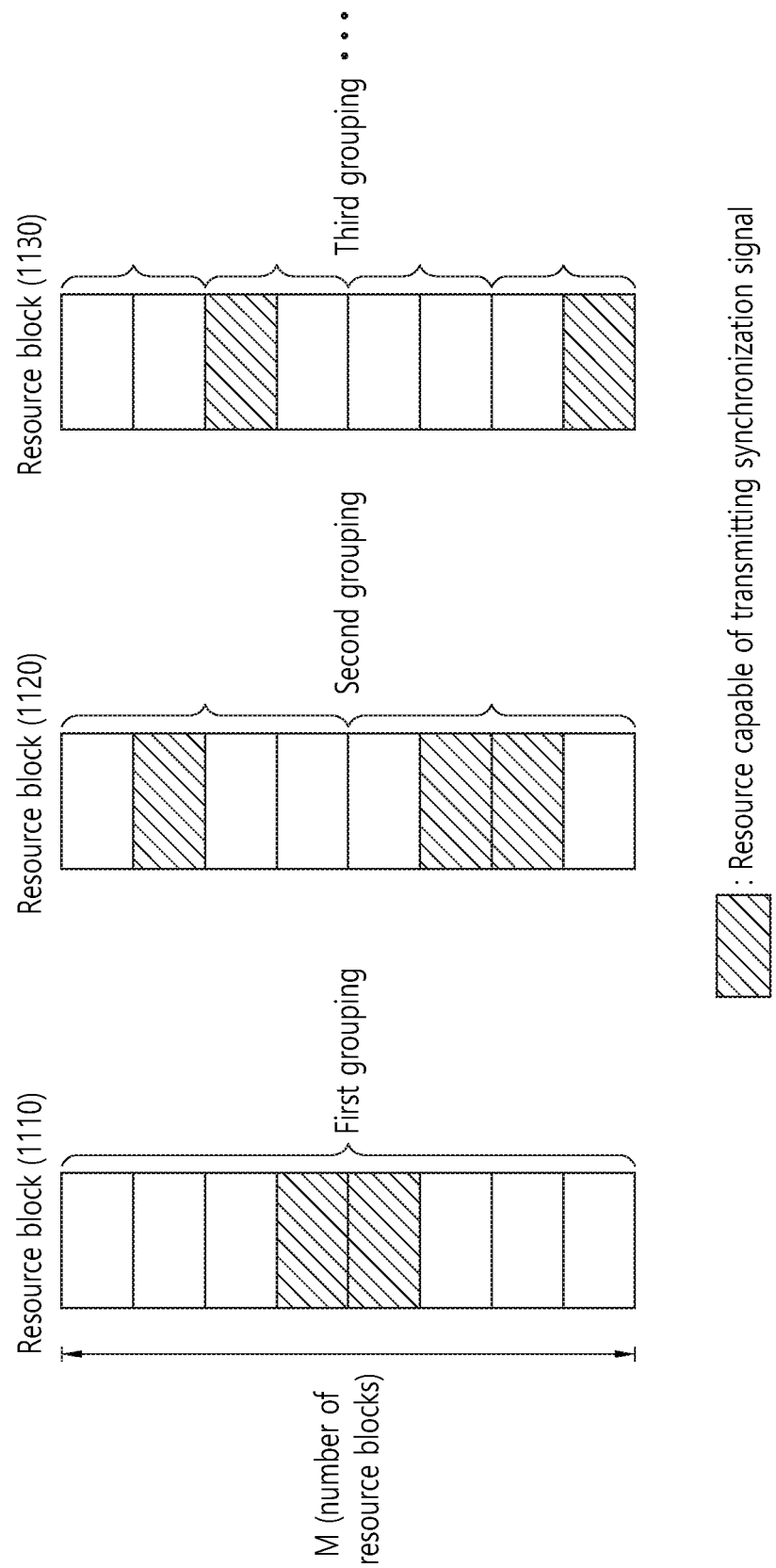
FIG. 11 is a diagram showing an example of grouping resource blocks capable of transmitting a synchronization signal for a random numerology.

FIG. 11 is a diagram showing an example of grouping resource blocks capable of transmitting a synchronization signal for a random numerology.

As yet another example, a case where a number of resource blocks being assigned when a random numerology uses a whole band is equal to M, and where the resource blocks are sequentially assigned with indexes starting from 1 to M in accordance with the frequency will be assumed herein. Additionally, a case where the base station performs grouping of the resource blocks L number of times, and where an $l^{th}$ group of resource blocks is divided into $N_l$ number of groups. Herein, l=1, 2, . . . , L, and L is an integer greater than 1, and $N_l$ is a multiple of 1 or 2. More specifically, M number of resource blocks may be grouped by using L number of different methods. A first group of resource blocks may be divided into one large group (l=1, $N_l$=1), a second group of resource blocks may be divided into two large groups (l=2, $N_l$=2), and a third group of resource blocks may be divided into three large groups (l=3, $N_l$=4). The above-described example is shown in FIG. 11.

Referring to FIG. 11, each resource block group is configured of resource blocks having consecutive indexes, and the synchronization signal can be transmitted from a resource block having α number of middle indexes in each group. For example, the first group of resource blocks (1110) may transmit a synchronization signal from two middle resource blocks. Additionally, the second group of resource blocks (1120) may transmit a synchronization signal from one middle resource block in the first resource block group and a synchronization signal from two middle resource blocks in the second resource block group. And, the third group of resource blocks (1130) may transmit a synchronization signal from middle 1 number of resource blocks in the second resource block group and the fourth resource block group.

More specifically, in case the base station has performed grouping L number of times, a maximum number of synchronization signals that can be transmitted is equal to $\Sigma_{l=1}^{L} N_l$.

It is preferable that a synchronization signal within a random numerology is transmitted from a position near a central frequency of the band in which the corresponding numerology is applied. Additionally, in order to reduce the overhead of the synchronization signal detection of the UE, the area (resource) from which the synchronization signal can be transmitted is required to be restricted (or limited). In order to do so, the above-described resource block is limited to be grouped only in multiples of 1 or 2 (herein, $N_l$ is a multiple of 1 or 2). More specifically, Index l of the resource block in which the synchronization signal can be transmitted may be designed to satisfy the following equation.

$$l \in \left[ \frac{M}{2N_l} - \alpha + (n-1)\frac{M}{N_l}, \frac{M}{2N_l} + \alpha - 1 + (n-1)\frac{M}{N_l} \right] \quad \text{[Equation 1]}$$

Additionally, Index l of the resource block that is capable of transmitting a synchronization signal may be designed to satisfy the following equation.

$$l \in \left[ \frac{M_1}{2N} - \alpha + 1 + (n-1)\frac{M_1}{N}, \frac{M_1}{2N} + \alpha + (n-1)\frac{M_1}{N} \right] \quad \text{[Equation 2]}$$

Additionally, the tracking area managing unit transmits information corresponding to L and $N_l$, and l=1, 2, ..., L to the base stations within the TA, thereby being capable of notifying a maximum number of resources capable of transmitting synchronization signals that can be used by the base station.

Additionally, the tracking area managing unit delivers resource block candidates, which are authorized to the base stations of the corresponding tracking area, among the total resources capable of transmitting synchronization signals, to the UEs within the tracking area. More specifically, the tracking area managing unit delivers the L and $N_l$ values and information indicating a resource that can actually be applied, among the $\Sigma_{l=1}^{L} N_l$ number of maximum available resources. The resource that can actually be applied may be indicated by being mapped to indexes ranging from 1 to $\Sigma_{l=1}^{L} N_l$ or be delivered in a bitmap format by using $\Sigma_{l=1}^{L} N_l$ number of bits.

Additionally, even if the transmission positions of the synchronization signals within a random numerology are the same, the base station may configure the bandwidth of the corresponding numerology differently. Even if the number of resources in which the random numerology can transmit the synchronization signals is limited to $\Sigma_{l=1}^{L} N_l$, a width of the bandwidth that can be allocated to the corresponding numerology should be configured more diversely. This is because limiting (or restricting) the transmission position of a synchronization signal is needed in order to reduce the level of complexity in the UE and also because it is advantageous, in the aspect of resource utilization, that the width of the bandwidth of the numerology is configured to be as diverse as possible.

As yet another example, in a specific numerology within a specific carrier of a random network, which is operated by a service provider, the position of a synchronization signal may not change. Therefore, the tracking area managing unit (or base station) may transmit an indicator, which indicates whether or not a synchronization signal transmitting resource is changed, to the UE for each numerology within a single carrier frequency.

For example, since a single numerology is used in a case where a specific carrier frequency provides only an enhanced Mobile Broad Band (eMBB), or in a case where a specific carrier frequency provides only an Ultra-reliable and Low-Latency Communication (URLLC), the transmission resource of a synchronization signal does not change. Alternatively, in case of the URLLC, the transmission resource of the synchronization signal may be randomly fixed in order to minimize latency (or delay). Therefore, it will be preferable to transmit an indicator, which notifies (or announces) that the transmission resource of a synchronization signal can be changed, to the UE.

The indicator information indicating whether or not a transmission resource of a synchronization signal is changed may be transmitted at the same time as the synchronization signal information within the above-described tracking area. When the UE receives an indicator indicating that the position of the synchronization signal is not changed, the UE regards that the synchronization signal information within the tracking area is not received.

Figure 12:
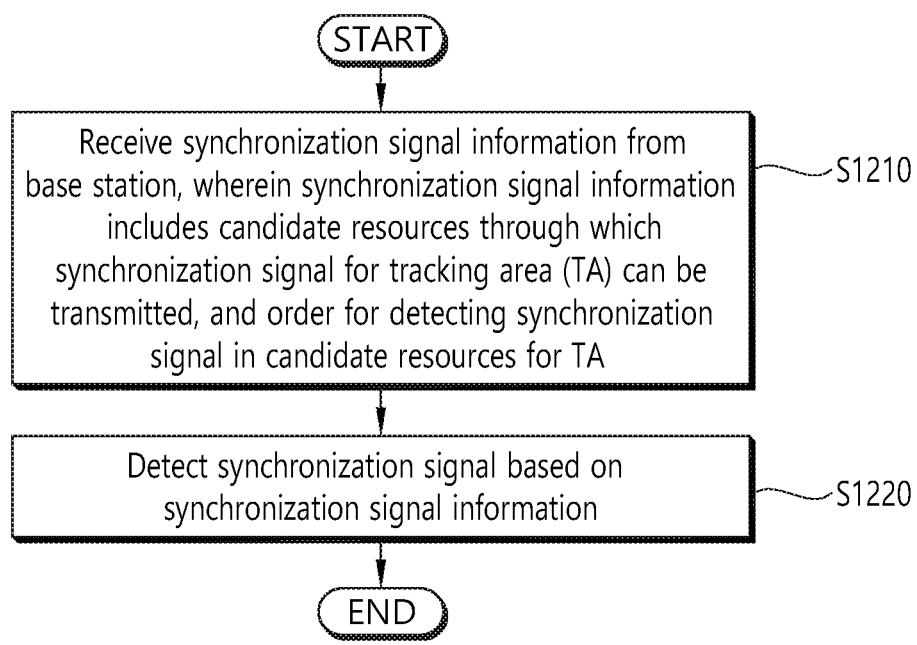
FIG. 12 is a flow chart showing a procedure of measuring downlink synchronization performed by a wireless communication system applying multiple numerologies according to an exemplary embodiment of this specification.

FIG. 12 is a flow chart showing a procedure of measuring downlink synchronization performed by a wireless communication system applying multiple numerologies according to an exemplary embodiment of this specification.

Firstly, the terms will be defined. A connectionless transmission may correspond to the transmission of data performed by a UE, which is in an idle state, to the base station. A connection transmission (or connected transmission) may correspond to the transmission of data performed by a UE to the base station, after an RRC connection and a data connection is established between the UE and the base station. A numerology may correspond to diverse numeric values that can be used in a next generation communication system, which is used for the purpose of high reliability and low latency (or delay). For example, a numerology may correspond to a length of a subframe (TTI length), subcarrier spacing, a number of symbols in a subframe, and/or a CP length, and so on.

Firstly, in step S1210, the UE receives first synchronization signal information from the base station. The first synchronization signal information includes candidate resources where the synchronization signal can be transmitted for a tracking area (TA), and an order by which the synchronization signals are being detected from the candidate resources for the TA.

In step S1220, the UE detects a synchronization signal based on the first synchronization signal information.

In a wireless communication system applying multiple numerologies, since the position of a resource transmitting a synchronization signal for each numerology may be changed, it will be difficult to measure the downlink synchronization. If the downlink synchronization cannot be acquired, procedures, such as cell search, should all be performed, thereby causing a delay (or latency) in the communication. Therefore, the base station may be capable of easily acquiring the downlink synchronization by signaling additional information, such as the synchronization signal information.

At this point, the UE may receive the synchronization signal from the base station, and the resource in which the synchronization signal is received may be changed in accordance with the numerology within the candidate resources. The TA managing unit manages the resource from which the synchronization signal is being transmitted in TA units.

Additionally, the first synchronization signal information may designate an order for detecting the synchronization signals in accordance with an order having the largest number of synchronization signal transmissions in TA units or in accordance with an order of having the highest likelihood of detecting a synchronization signal. Accordingly, even if a resource receiving a synchronization signal changes in accordance with the numerology, the UE may determine the changed resource position of the synchronization signal and may then acquire the downlink synchronization.

In case the UE belongs to the TA, or in case the UE deviates from the TA and belongs to another TA, the first synchronization signal information may be received via L2/L3 signaling.

Additionally, the first synchronization signal information may be received while the UE is in a state of disconnecting itself from the base station, or the first synchronization signal information may be received along with a paging message while the UE is in a state of being disconnected from the base station. The state of the UE disconnecting itself from the base station may correspond to a state in which the UE has not yet released (or cancelled) its connection with the base station but currently attempting to disconnect itself from the base station.

When operating in the state of disconnecting itself from the base station, the UE may receive a synchronization signal transmitting resource list of a neighbor cell including second synchronization signal information from the base station. Additionally, the UE may update the second synchronization signal information. This is because, if the UE is aware of the synchronization signal transmitting resource of a neighboring cell before it shifts from the connected state (or connection state) to the disconnected state (or connectionless state), it will be more preferable to detect the synchronization signal by using this information.

The updated second synchronization signal information may be used for a predetermined period of time. The updated second synchronization signal information may be deleted or updated once again after the predetermined period of time. The predetermined period of time may be determined in accordance with a movement rate of the UE and a coverage of the neighbor cell. More specifically, unless the synchronization signal transmitting resource list of the neighbor cell becomes invalid due to the movement of the UE to a long distance, the UE may detect the synchronization signal by using the information of the neighbor cell.

At this point, the first synchronization signal information may not be used during the predetermined period of time and may be used after the predetermined period of time. More specifically, after the predetermined period of time, the UE may once again be capable of detecting synchronization signals through the first synchronization signal information.

The synchronization signal may correspond to a Primary Synchronization Signal (PSS) or a Secondary Synchronization Signal (SSS).

Additionally, the UE may receive an indicator indicating whether or not a resource, through which the synchronization signal is received, is changed within the candidate resources. In case the indicator indicates that the resource, through which the synchronization signal is received, is changed within the candidate resources, the indicator may be received from the base station at the same time as the first synchronization signal information. In case the indicator indicates that the resource, through which the synchronization signal is received, is not changed within the candidate resources, just as in the legacy communication system, a single numerology may be applied to the communication system, wherein the position of the transmission resource of the synchronization signal does not change. Accordingly, since additional signaling such as the first synchronization signal information is not needed, the UE does not receive the first synchronization signal information from the base station.

Figure 13:
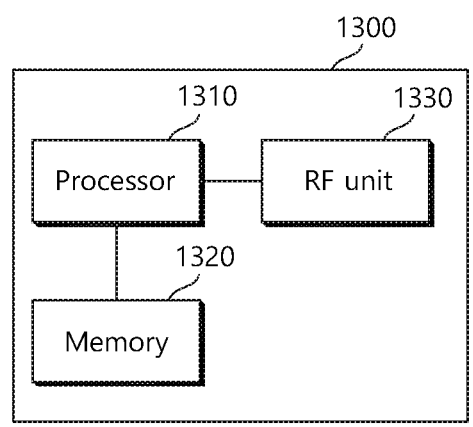
FIG. 13 is a block diagram showing an apparatus for wireless communication for implementing an embodiment of the present invention.

FIG. 13 is a block diagram showing an apparatus for wireless communication for implementing an embodiment of the present invention.

An apparatus (1300) for wireless communication includes a processor (1310), a memory (1320), and a radio frequency (RF) unit (1330).

The processor (1310) may be configured to implement proposed functions, procedures and/or methods described in this description. Layers of the radio interface protocol may be implemented in the processor (1310). The processor (1310) may handle a procedure explained above. The memory (1320) is operatively coupled with the processor (1310), and the RF unit (1330) is operatively coupled with the processor (1310).

The processor (1310) may include application-specific integrated circuit (ASIC), other chipset, logic circuit and/or data processing device. The memory (1320) may include read-only memory (ROM), random access memory (RAM), flash memory, memory card, storage medium and/or other storage device. The RF unit (1330) may include baseband circuitry to process radio frequency signals. When the embodiments are implemented in software, the techniques described herein can be implemented with modules (e.g., procedures, functions, and so on) that perform the functions described herein. The modules can be stored in the memory (1320) and executed by the processor (1310). The memory (1320) can be implemented within the processor (1310) or external to the processor (1310) in which case those can be communicatively coupled to the processor (1310) via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method in a wireless communication system, the method comprising:
receiving first synchronization signal information from a base station;
detecting a synchronization signal based on the first synchronization signal information, wherein the first synchronization signal information includes first information on candidate resources where the synchronization signal is capable of being transmitted for a tracking area (TA) and second information on an order by which the synchronization signal is being detected from the candidate resources for the TA, and wherein the first synchronization signal information is received while a user equipment (UE) is in a state of disconnecting itself from the base station, or wherein the first synchronization signal information is received along with a paging message while the UE is in a state of being disconnected from the base station; and receiving an indicator including information on whether or not a resource, through which the synchronization signal is received, is changed within the candidate resources.

2. The method of claim 1, wherein, in case the UE belongs to the TA, or in case the UE deviates from the TA and belongs to another TA, the first synchronization signal information is received via L2/L3 signaling.

3. The method of claim 1, wherein, when the UE is in a state of disconnecting itself from the base station, the method further comprises:

receiving a synchronization signal transmitting resource list of a neighbor cell including second synchronization signal information from the base station; and updating the second synchronization signal information.

4. The method of claim 3, wherein the updated second synchronization signal information is used for a predetermined period of time, wherein the updated second synchronization signal information is deleted or updated once again after the predetermined period of time, and wherein the predetermined period of time is determined based on a movement rate of the UE and a coverage of the neighbor cell.

5. The method of claim 4, wherein the first synchronization signal information is not used during the predetermined period of time, and wherein the first synchronization signal information is used after the predetermined period of time.

6. The method of claim 1, wherein the synchronization signal corresponds to a Primary Synchronization Signal (PSS) or a Secondary Synchronization Signal (SSS).

7. The method of claim 1, wherein, in case the indicator includes information on a change in the resource, through which the synchronization signal is received, within the candidate resources, the indicator is received, from the base station, at a same time as the first synchronization signal information, and wherein the resource, in which the synchronization signal is received, is changed based on numerology within the candidate resources.

8. A wireless device in a wireless communication system, the wireless device comprising:

a radio frequency (RF) unit transmitting and receiving radio signals; and a processor being operatively connected to the RF unit, wherein the processor:

receives first synchronization signal information from a base station, detects a synchronization signal based on the first synchronization signal information, wherein the first synchronization signal information includes first information on candidate resources where the synchronization signal is capable of being transmitted for a tracking area second information on an order by which the synchronization signal is being detected from the candidate resources for the TA, and wherein the first synchronization signal information is received while a user equipment (UE) is in a state of disconnecting itself from the base station, or wherein the first synchronization signal information is received along with a paging message while the UE is in a state of being disconnected from the base station, and receives an indicator including information on whether or not a resource, through which the synchronization signal is received, is changed within the candidate resources.

9. The wireless device of claim 8, wherein the updated second synchronization signal information is used for a predetermined period of time, wherein the updated second synchronization signal information is deleted or updated once again after the predetermined period of time, and wherein the predetermined period of time is determined based on a movement rate of the UE and a coverage of the neighbor cell.

10. The wireless device of claim 9, wherein the first synchronization signal information is not used during the predetermined period of time, and wherein the first synchronization signal information is used after the predetermined period of time.

11. The wireless device of claim 8, wherein, when the UE is in a state of disconnecting itself from the base station, the processor receives a synchronization signal transmitting resource list of a neighbor cell including second synchronization signal information from the base station, and updates the second synchronization signal information.

* * * * *